US006952676B2

(12) United States Patent
Sherman (10) Patent No.: US 6,952,676 B2
(45) Date of Patent: Oct. 4, 2005

(54) VOICE RECOGNITION PERIPHERAL DEVICE

(76) Inventor: William F. Sherman, 22382 Avenida Empresa, Rancho Santa Margarita, CA (US) 92688

( * ) Notice: Subject to any disclaimer, the term of this patent is extended or adjusted under 35 U.S.C. 154(b) by 659 days.

(21) Appl. No.: 09/904,256

(22) Filed: Jul. 11, 2001

(65) Prior Publication Data

US 2002/0065662 A1 May 30, 2002

Related U.S. Application Data

(60) Provisional application No. 60/217,365, filed on Jul. 11, 2000, and provisional application No. 60/261,713, filed on Jan. 12, 2001.

(51) Int. Cl.[7] .......................... G10L 21/00; G10L 15/26
(52) U.S. Cl. ..................... 704/270; 704/275; 455/556.2
(58) Field of Search ................................ 704/270, 275, 704/260; 455/556.2, 557, 569, 563, 90, 556, 575, 566

(56) References Cited

U.S. PATENT DOCUMENTS

| 6,047,257 | A | * | 4/2000 | Dewaele ...................... 704/270 |
| 6,138,100 | A | * | 10/2000 | Dutton et al. ................ 704/275 |
| 6,377,825 | B1 | * | 4/2002 | Kennedy et al. .......... 455/569.2 |
| 6,424,369 | B1 | * | 7/2002 | Adair et al. ................... 348/76 |
| 6,549,789 | B1 | * | 4/2003 | Kfoury ...................... 455/550.1 |
| 6,587,700 | B1 | * | 7/2003 | Meins et al. .............. 455/575.8 |
| 6,604,681 | B1 | * | 8/2003 | Burke et al. ................. 235/383 |
| 6,678,535 | B1 | * | 1/2004 | Narayanaswami .......... 455/557 |
| 6,711,419 | B1 | * | 3/2004 | Mori ........................ 455/556.1 |

* cited by examiner

Primary Examiner—Susan McFadden
(74) Attorney, Agent, or Firm—Rutan & Tucker, LLP; Robert D. Fish; Martin Fessenmaier (57) ABSTRACT

Methods and apparatus are provided in which a voice recognition peripheral device (VRPD) is in electronic communication with and releasibly attached to a personal digital assistant (PDA). Voice recognition software or hardware is provided on the VRPD to provide voice commands that are transferred to an application that is executed on the PDA, or to provide voice data in a digital format to the PDA.

18 Claims, 5 Drawing Sheets

VOICE RECOGNITION PERIPHERAL DEVICE

This application claims the benefit of U.S. provisional application Ser. No. 60/217,365 filed Jul. 11, 2000 and U.S. provisional application Ser. No. 60/261,713, filed Jan. 12, 2001, both of which are incorporated herein by reference.

FIELD OF THE INVENTION

The field of the invention is voice recognition for hand-held devices.

BACKGROUND OF THE INVENTION

Personal digital assistants (PDA) and other hand-held or pocketable computers have become an increasingly important tool for many users that require mobile data management. Improved computing power enabled PDAs to run complex tasks (e.g., database applications), while at the same time the development of smaller and more efficient storage enabled relatively large quantities of data (i.e., in excess of 10 MB) to be stored. With increased computing and storage capabilities, data input was often the limiting factor in mobile computing.

To facilitate data input, various methods have been developed. In one method, data are generated and manipulated on a desktop or laptop computer, and subsequently transferred to the PDA or other hand-held or pocketable device. While desktop or laptop based data generation, manipulation, and transfer are relatively convenient, manipulation and input of data into the PDA tends to be limited to points of use where a desktop or laptop computer are available. Moreover, additional equipment is required to enable a computer to transfer data to a PDA. For example, a cable, or an infrared transmitter may be used to facilitate transfer of data between a computer and a PDA.

In another method, a keyboard is attached to the PDA. Attachable keyboards are simple to use, however, many users experience difficulties operating the attachable keyboard due to its relatively small size (typically not larger than the PDA unit). To circumvent at least some of the problems associated with the small size of an attachable keyboard, foldable keyboards have been developed that increase the effective keyboard space two to three times when compared to non-foldable keyboards. Nevertheless, foldable and non-foldable keyboards must still be transported and attached to the PDA. Moreover, movable parts in a foldable keyboard typically increase the risk of mechanical or electrical failure.

In yet another method, the PDA includes a pressure or contact sensitive area that is employed to input and manipulate data in the PDA. While in some PDAs the sensitive area is a touch screen, other PDAs employ a touch pad-type input area. Regardless of the type of area, the input space is generally limited to a relatively small area. Moreover, and especially where large sets of data are modified in several subsequent operations, a relatively small screen is often not sufficient for proper and/or convenient data manipulation. A still further problem is that the input needs to be translated into text or other electronically processable format, which necessitates dedicated software to recognize manual data input. Another problem with a pressure or contact sensitive area, as with the other methods of input described above, is that at least some manual operation is required.

Thus, although various methods of data input to a PDA are known in the art, all of them suffer from one or more disadvantages. Therefore, there is still a need to provide improved methods and apparatus to facilitate data input into a PDA.

SUMMARY OF THE INVENTION

Methods and apparatus are provided in which a voice recognition peripheral device (VRPD) is in electronic communication with and releasibly attached to a personal digital assistant (PDA) that executes a program, and in which the VRPD receives a first data element from the program and a voice command provided by a user, processes the first data element into an audible prompt, and in which the VRPD processes the voice command into a second data element using a voice recognition algorithm and transfers the second data element to the program.

In one aspect, the program on the PDA intercepts a prompt from an application that is executing on the PDA and converts the prompt into the first data element, and may further convert the second data element into an input into the application. Preferred applications include calendar applications, address book applications, and memo applications.

In another aspect of the inventive subject matter, the voice recognition algorithm comprises a continuous or discrete speech algorithm and may further use a user uploaded set of data to processes the voice command into the second data element. Alternatively, voice recognition may be performed using hardware with built-in voice-recognition capability (e.g., CODEC). Audible prompts are contemplated to include a selection-prompt to the user to select at least one of the applications and/or a request-prompt that requests an application-input for at least one of the applications.

In a further aspect of the inventive subject matter, a voice recognition peripheral device (VRPD) is in electronic communication with and releasibly attached to a personal digital assistant (PDA), wherein the VRPD processes a user voice into a digital data element using a voice recognition algorithm, and wherein the digital data element is transferred to the PDA.

In a still further aspect of the inventive subject matter, a method of operating an electronic device includes a step in which a voice recognition peripheral device (VRPD) and a personal digital assistant (PDA) executing a program are provided. In a further step, the VRPD is releasably attached to the PDA thereby providing electronic communication between the VRPD and the PDA, wherein the VRPD receives a first data element from the program and a voice command provided by a user, the VRPD processes the first data element into an audible prompt, and wherein the VRPD processes the voice command into a second data element using a voice recognition algorithm and transfers the second data element to the program.

Alternatively, it is contemplated that a method of operating an electronic device includes a step in which a voice recognition peripheral device (VRPD) and a personal digital assistant (PDA) are provided. In a further step, the VRPD is releasably attached to the PDA thereby providing electronic communication between the VRPD and the PDA, and in a still further step a user voice is processed into a digital data element using a voice recognition algorithm provided by the VRPD. In another step the digital data element is transferred from the VRPD to the PDA via an electronic interface.

Various objects, features, aspects and advantages of the present invention will become more apparent from the following detailed description of preferred embodiments of the invention, along with the accompanying drawing.

DETAILED DESCRIPTION

The inventors have discovered that a PDA can be functionally coupled to a VRPD to provide an alternative and/or additional mode of data input and/or operation of the PDA. More particularly, the inventors contemplate that a voice recognition peripheral device (VRPD) is in electronic communication with and releasably attached to a personal digital assistant (PDA) that executes a program, wherein the VRPD receives a first data element from the program and a voice command provided by a user, wherein the VRPD processes the first data element into an audible prompt, and wherein the VRPD processes the voice command into a second data element using a voice recognition algorithm and transfers the second data element to the program.

As used herein, the term "PDA" refers to an electronic device that (a) is sufficiently small to allow hand-held operation (i.e., has a largest dimension no longer than 8 inches), and (b) uses a touch screen for data input. The term "touch screen" as used herein refers to an area that includes an electronic display and that translates contact of an object (e.g., finger or pen) to the area into an electronic signal. Therefore, a desk top computer, a cell phone, or a notebook computer are not considered PDAs under the scope of this definition because these devices are not hand held and/or do not use a touch screen for data input.

As also used herein, the term "VRPD" refers to an electronic device that executes a program (or employs hardware) that translates voice into digital electronically readable data (i.e., digital data elements), wherein the VRPD is sufficiently small to allow hand-held operation (i.e., largest dimension no longer than 10 inches).

As further used herein, the term "electronic communication" is refers to any transfer of digital and/or analog data, and particularly includes data transfer via an electric conductor and wireless transfer. As still further used herein, the term "VRPD is releasably attached to the PDA" means that the VRPD is secured to the PDA in a fixed and predetermined spatial relationship at a distance of no more than 10", wherein the VRPD can be physically separated from the PDA to allow operation of the PDA independent from the VRPD.

As also used herein, the term "voice command" refers to any audible command in electronic or acoustic form, wherein the term "command" includes a word, a phoneme, a character, a number, and any reasonable combination of thereof.

Figure 1:
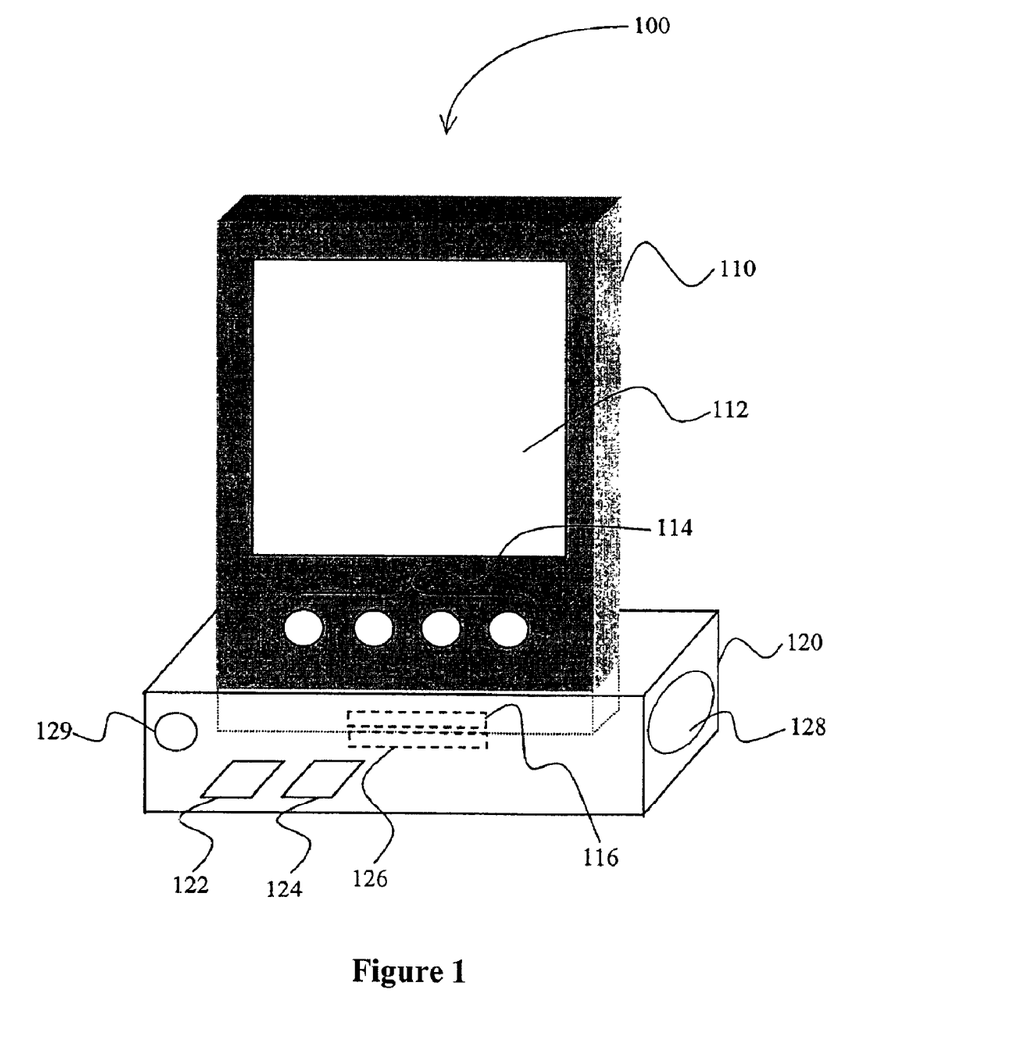
FIG. 1 is a perspective schematic view of an exemplary voice recognition peripheral device (VRPD) coupled to a PDA according to the inventive subject matter.

In an exemplary configuration as depicted in FIG. 1, a VRPD-PDA combination 100 includes a PDA 110 that is releasibly attached to a VRPD 120. The PDA 110 has a display portion 112 and a plurality of control buttons 114, and an electronic interface 116 (in phantom) on the bottom portion of the PDA. The interface 116 of the PDA is in electrical communication with the VRPD 120 via corresponding VRPD port 126 (also in phantom). The VRPD port 126 is further electronically coupled to a central processing unit (CPU) 122. CPU 122 is further electronically coupled to a memory chip 124, microphone 129, and loudspeaker 128.

With respect to the PDA it should be appreciated that numerous PDAs are suitable for use herein, and appropriate PDAs may include PDAs with a Windows CE operating system, a Palm operating system, or any other operating system that is appropriate for use in a hand held device. Preferred PDA include a Handspring Visor, a Palm IIIe, a Palm IIIXe, a Palm Vx, a Compaq Aero, Casio Cassiopeia, etc., all of which are commercially available.

The electronic interface is preferably a standard electronic plug-type interface commonly found on a PDA, most commonly a RS232. However, various alternative interfaces are also contemplated and include an USB interface, an IDB-C interface, an ISO11898 compliant CAN interface, or an IEEE1394 interface. With respect to the data transfer protocol for communication between the VRPD and the PDA, it is generally preferred that the VRPD will adopt the data transfer protocol provided by the PDA for the respective PDA port. Thus, preferred data transfer protocols will especially include RS232-compatible data transfer protocols.

Alternatively, contemplated PDA ports may be employed to communicate with a wireless interface that allows wireless electronic communication between the VRPD and the wireless interface. Particularly preferred wireless interfaces include such as a radio transceiver (e.g., interface following the 'blue tooth' standard) or an opto-electronic transceiver (e.g., an IR-transceiver). It is generally contemplated that numerous alternative interfaces are also suitable so long as data can be exchanged from the PDA to the VRPD in at least unidirectional, and more preferably bi-directional manner.

Figure 2:
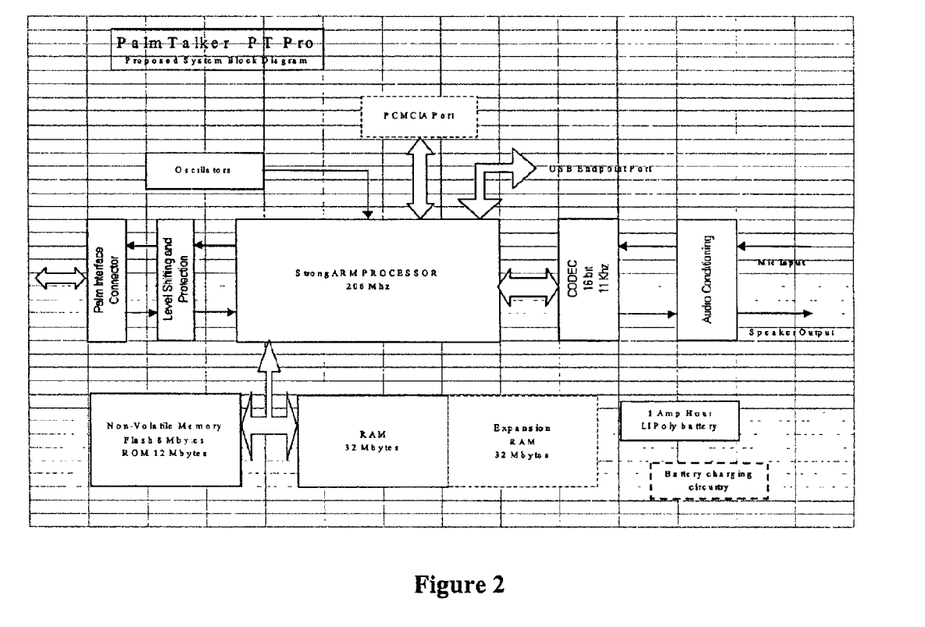
FIG. 2 is a system block diagram of an exemplary preferred VRPD.

With respect to the VRPD, it is generally contemplated that the VRPD comprises at least a minimum configuration that enables the VRPD to translate voice into a digital data (i.e., digital electronically readable) format. Thus, suitable VRPDs will typically include a power source, a central processing unit (CPU) which may or may not have an internal CODEC engine, a mass data storage unit, and a memory unit. In a particularly preferred configuration, the VRPD comprises a commercially available Intel®StrongARM microprocessor and optional companion chips, a CODEC (e.g., Intel® Audio Codec'97) for D/A and A/D conversion, 32 MBRAM, 32 MB Flash RAM, a USB and a RS232 interface, which is depicted in FIG. 2.

It is generally contemplated that the CPU, mass data storage unit and memory unit may vary considerably and that a particular configuration of such elements will predominantly depend on the type of voice recognition algorithm employed. For example, where the voice recognition algorithm comprises continuous speech recognition, contemplated VRPDs will include a Pentium®III processor or higher with a clock frequency of at least 266 MHz, more preferably a Pentium®III at a speed of up to 800 MHz, and most preferably a Pentium IV at a speed of up to 1.8 GHz. Alternatively, and especially where the speech recognition employs a relatively limited vocabulary, numerous other procesors such as the Intel StongARM are especially contemplated. On the other hand, where the voice recognition algorithm comprises a discrete speech (i.e., a word-by-word) recognition algorithm, or a character recognition algorithm, it is contemplated that less processing power will be required. Thus, suitable processors will include a Pentium®III processor or lower with a clock frequency of about 266 MHz, or less.

Similarly, contemplated mass data storage units will vary depending on the particular configuration of the VRPD, and particularly suitable mass storage units include commercially available micro hard drives with a 1-inch disc (which may preferably have a capacity of more than 1 GB), flash memory cards with a capacity of up to 128 MB and more, and other transient and/or permanent memory units. Likewise, suitable memory units may include SDRAM, SIMM, DIMM, etc. with a capacity of at least 32 MB, more preferably at least 64 MB, and most preferably above 128 MB.

In particularly contemplated aspects of the inventive subject matter, the CPU is functionally coupled to a chip or chipset that provides 'hardwired' continuous speech recognition, and various suitable chips and chipsets are commercially available (see e.g., NSCEngine™-8ID from NSC—Natural Speech Communication Ltd., P.O.Box 5212, Rishon Lezion 75150, Israel).

Furthermore, depending on the particular configuration and size of the VRPD, it is contemplated that the power source may vary considerably. For example, where the VRPD is relatively large, suitable power sources may include a rechargeable battery. On the other hand, where the VRPD is relatively small appropriate power sources especially include an external power source (e.g., transformer for wall outlet or cigarette lighter adapter). With respect to the user voice input and speech output it should be appreciated that the VRPD may include a microphone and/or a speaker. However, it is preferred that the VRPD includes an electronic connector (e.g., standard phone jack and/or microphone jack), or uses an external microphone/speaker, which may even be provided by the PDA.

With respect to the user voice command it should be appreciated that a human voice is preferred, however, various alternative voice commands are also contemplated. For example, appropriate voice commands may comprise a stream of analog or digital information that encodes a sound pattern (e.g., a word, phoneme, or character). Therefore, the PDA need not be restricted to employ a microphone as a means for acoustic data acquisition, but may also include an electrical connector or transient memory that receives analog or digitally encoded acoustic data. The acquisition means may further include circuitry, or software that filters, modifies, or otherwise electronically changes the acquired acoustic data.

With respect to the voice recognition algorithm, it should be appreciated that all known algorithms are appropriate so long as the algorithm processes acoustic data into a text format. Thus, contemplated algorithms include continuous speech, discrete speech, and character-by-character recognition algorithms. Particularly contemplated continuous speech algorithms include commercially available programs such as ViaVoice, Naturally Speaking, and Voice Express, while especially preferred discrete speech recognition algorithms include commercially available programs such as Dragon Dictate. In alternative preferred aspects, contemplated voice recognition is performed using dedicated hardware (supra).

Similarly, it is contemplated that the translation of the first data element into the audible prompt is performed using the voice recognition software or hardware. On the other hand, where such text-to-speech translation is not available, it is contemplated that the text-to-speech translation may be performed using commercially available soft- and hardware (e.g., by AcuVoice, Elan, or SoftVoice). In further alternative aspects of the inventive subject matter, it is contemplated that the translation of the user voice command is at least in part perormed using a user-uploaded set of data. Particularly preferred user uploaded sets of data may include a profession-specific vocabulary, or a general vocabulary to accommodate to a particular user's speech pattern (e.g., dialect or accent). Among other uses, it is especially preferred that the mass data storage unit and/or the memory unit may be employed as a database for user-uploaded characters or words.

In one typical use of contemplated exemplary VRPD-PDA combinations, the PDA includes a plurality of application (e.g., calendar application, address book application, or memo application), and the program intercepts intercepts a prompt from the application that is executing on the PDA. For example, if an address book application is executing on the PDA, a request prompt (e.g., a field name related to the application) from the application may include a prompt for a name, a street, a ZIP code, a city, and so forth. The request prompt is converted to a first data element, which is then transferred from the program to the VRPD, which in turn translates the first data element into an audible prompt using the text-to-speech translation portion in the VRPD. Thus, a request prompt from an application that is normally displayed on the PDA's screen is now transferred from the PDA to the VRPD and converted into an audible request. In response to the audible request, the user provides a voice command (i.e. feedback) to the VRPD, which translates the voice command into a second data element using the voice recognition algorithm. The so generated second data element is then transferred to the program in the PDA, which in turn converts the second data element into an input into the application.

Similarly, it is contemplated that the program may provide the VRPD with a first data element that includes a selection-prompt to prompt a user to select a program among the programs available on the PDA. The VRPD will then translate the first data element into an audible prompt, which will request a choice of program by the user.

Where appropriate, it is contemplated that the input may be visually or acoustically verified by the PDA. For example, the second data element generated by the VRPD may also be displayed on the display of the PDA. Alternatively, a green light on the PDA display may be the only indication of receipt of data the into the PDA. In still another example, the PDA may visually or acoustically indicate that some or all of the acoustic data have not been interpreted (e.g., where words are not 'understood' by the translation algorithm). It is particularly contemplated that the VRPD recognizes commands within the acoustic input data to operate or activate programs executed on the PDA. This is especially advantageous where a "hands-free" operation of the VRPD or VRPD-PDA combination is desired (supra).

Where the PDA-VRPD combination or the VRPD communicates with a personal computer (PC), it is contemplated that acoustic data as well as text data may be up- or downloaded to the PDA-VRPD combination or the VRPD. For example, text data may be communicated from the VRPD to the PC, and the text may then be edited on the PC. Alternatively, where a PC serves as a voicemail mail box, the voice file may be transferred from the PC to the VRPD, translated into a text file, and then be distributed back to the PC or to the PDA, or both. Various transfer protocols, including the "Hotsync" protocol are contemplated for data transfer.

Figure 3:
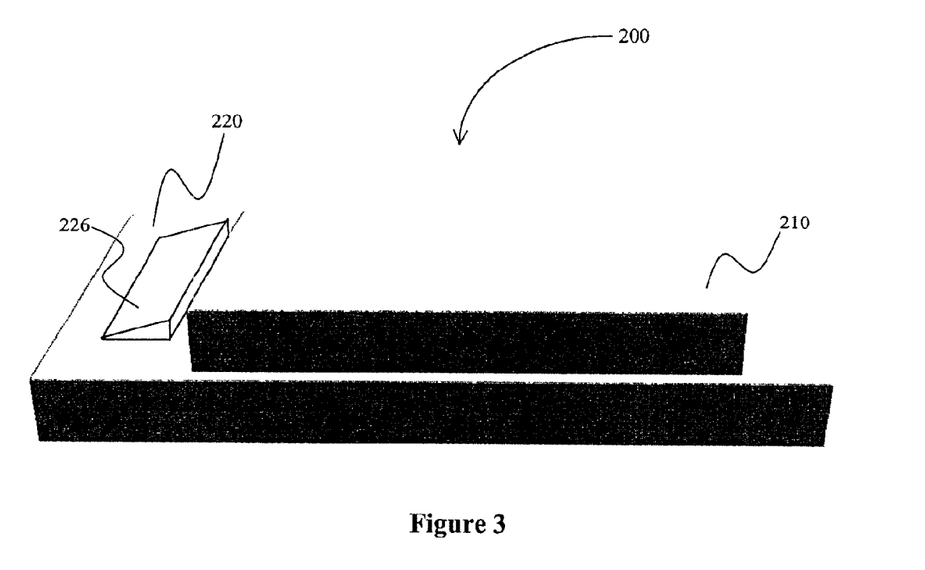
FIG. 3 is a perspective schematic view of an alternative configuration of a voice recognition peripheral device (VRPD) coupled to a PDA.

FIG. 3 shows an alternative configuration of a PDA-VRPD combination 200, in which the PDA 210 is horizontally coupled to the VRPD 220 via VRPD port 226. VRPD port 226 is used to establish the electronic connection between the VRPD and the PDA. While it is not necessary that the devices be immediately adjacent to each other, it is contemplated that they will be no more than 6 inches apart when attached. Again, it is contemplated that the VRPD port 226 is any connection suitable for communication between the VRPD and the PDA including a serial port, a parallel port, a USB port, and an SCSI interface. Alternatively, a wireless mode of data transfer is also contemplated in which wireless devices such as an infrared transceiver and a wireless modem may be used.

Figure 4:
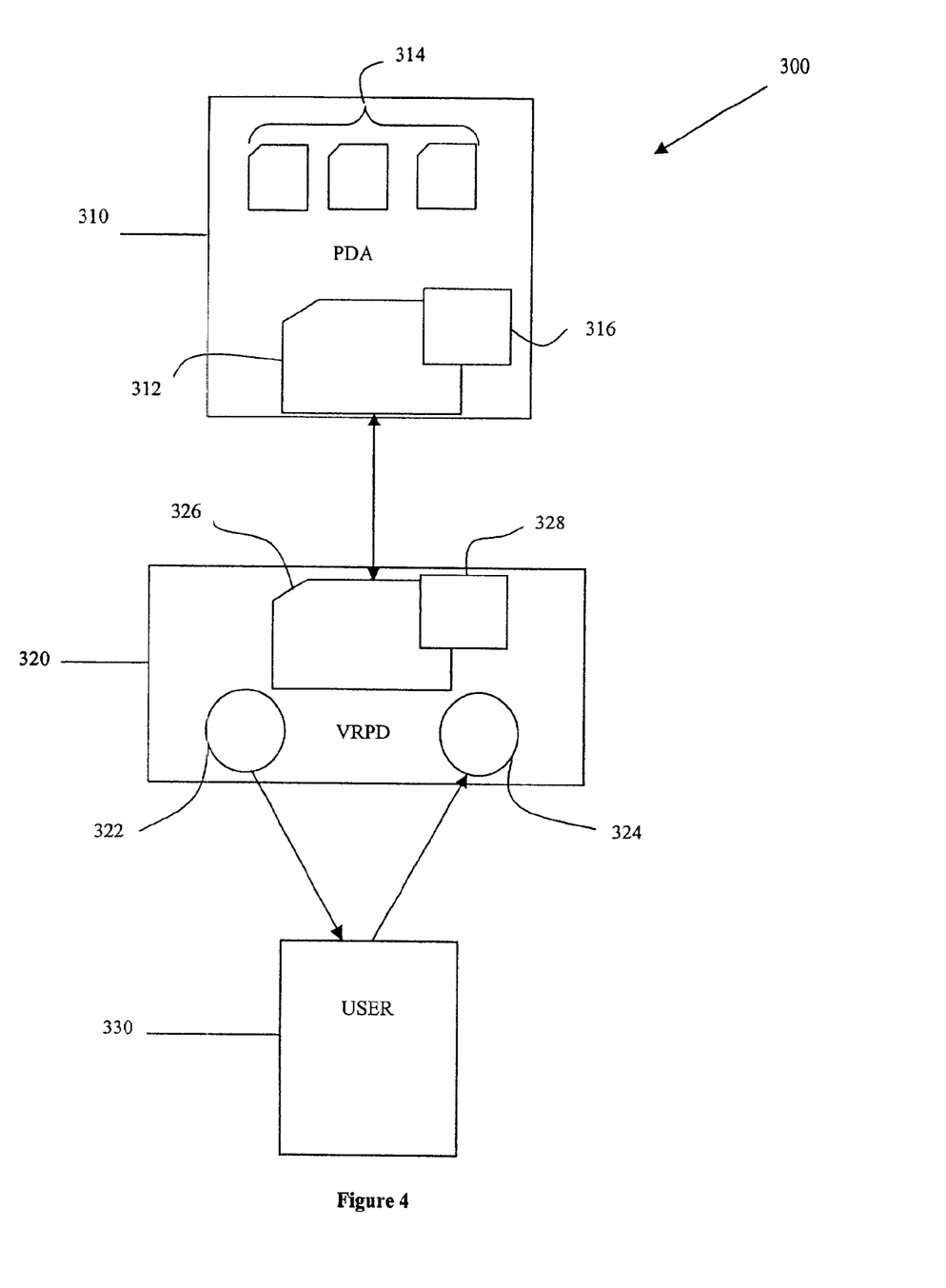
FIG. 4 is a schematic view of a device and method of inputting data into a PDA.

In FIG. 4, a device and method 300 of inputting data to a PDA generally includes a PDA 310, a VRPD 320, and a user 330. A PDA 310 executes a program 312 that is instructed to output a first data element 316 to the VRPD in response to a prompt that is intercepted from an application software running on the PDA. Thus, contemplated programs function as an interface managing communications between application programs 314 on the PDA 310 and Voice recognition software 326 on the VRPD. In this function, the VRPD and the PDA remain attached to each other while the program manages communications between the devices.

In another aspect, the program may function to download and upload application programs and data to and from the VRPD. In this function, the two devices may be detached because at least a portion of the application software has been downloaded to the VRPD, and he VRPD may be at least temporarily operated independently of the PDA.

The first data element 316 contains data that may be processed into an audible prompt. The audible prompt is digitally recited to the user through a speaker 322 on the VRPD 320. The audible prompt generally comprises information that informs the user of the type of information the application running on the PDA is requesting. For example, the first audible prompt that a user may hear may be "Please select address book, calendar, or memo pad." In this case, there may be a plurality of first data elements including "address book", "calendar" and "memo pad". A subsequent command will often contain field related data. For example, "name", "street address", "city" and so on. In any case, the first data element is preferably translated into an audible prompt by a text-to-speech algorithm that is digitally recited to the user.

In an embodiment having a program that downloads at least a portion of an application program, the first data element may contain a copy of an entire application program, or a portion of an application program. It is preferred that the application program, or portion thereof, be readily executable on the VRPD. In such an embodiment, the user interacts with the application program through the VRPD without the necessity of being in electronic communication with the PDA. Typically, the user will transfer an entire file of data to the PDA once the interaction is completed. The file may be virtually any file type including WAV and TXT.

The audible prompt is generally output through the speaker 322 on the VRPD, and in response, the user 330 will recite at least one voice command into the microphone 324 on the VRPD. While a preferred VRPD has both a speaker and a microphone, it is contemplated that the speaker and/or the microphone may be external to the VRPD, and may be hardwired or even wireless. The speaker and microphone may be part of a headset that may be worn by the user. In a preferred embodiment, the VRPD has an input jack for connection of a headset. Since the VRPD generally uses a microphone and speaker, it is contemplated that the voice recognition functions and electronic connections of the VRPD may be added to a cellular phone.

The second data element 328 is derived from verbal input provided by the user. The user preferably speaks a voice command into a microphone, and the voice command is processed by the voice recognition software 326 into an input that can be interpreted by the program 312 on the PDA 310. Thus, the second data element generally has data that will be used as input to at least one application program residing on the PDA.

The voice recognition software 326 preferably comprises a continuous speech algorithm that can process spoken words into digital input. It is also contemplated that the voice recognition software may contain other and/or additional algorithms such as a word-to-word or character-to-character algorithm. The voice recognition software may also contain instructions that enable it to communicate with the program residing on the PDA or with downloaded application programs residing on the VRPD.

In an especially preferred aspect, the program that executes on the PDA generally intercepts prompts directed by the application program to a display. In a preferred aspect, contemplated programs intercept prompts of text only by scanning the output of the application program, and intercepting the text only portions. Alternatively, a screen capture program (e.g. SnagIt v5.0, and Capture Professional) may be used to intercept prompts, and text data are extracted from the information returned by the screen capture.

With respect to the conversion of the prompt into the first data element it is contemplated that the conversion of the prompt into the first data element generally involves extracting and isolating a text portion of the prompt, however, extraction and isolation may not be necessary if the prompt contains text only data when the program receives it. While not critical to the inventive subject matter, it is contemplated that the first data element may be stored or moved into a file having address information directing the first data element to the VRPD via a port such as an RS232 serial port, a parallel port, or a USB port. Alternatively, the program may operate to transfer at least a portion of an application program to a VRPD, wherein the function of intercepting the prompts will most likely be handled by another program running on VRPD.

Figure 5:
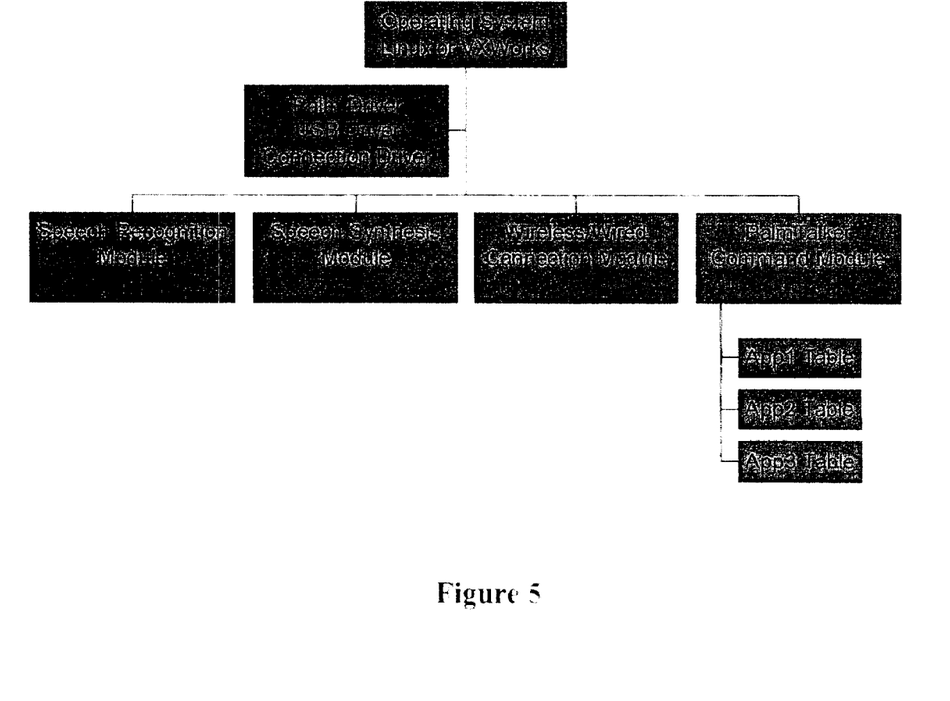
FIG. 5 is a software system block diagram of an exemplary contemplated VRPD.

In addition to intercepting prompts and converting prompts, the program also operates to convert a second data element into an input into the application program. The second data element is typically a voice command that has been converted to text by a voice recognition algorithm (supra). The second data element is preferably output by the program and becomes input to the application program on the PDA. Alternatively, the program may write the second data element directly to a database (e.g. the appropriate database for the application program) or store it for retrieval by the application or other program. A general program organization chart is depicted in FIG. 5. In a further particularly contemplated aspect, a control program (which may be executed on the PDA and/or the VRPD) will control operation of the VRPD and/or VRPD/PDA combination. This control program will consist of the various modules, including a voice input routine (places digitized input speech in a buffer for the speech recognition program. Triggers the speech recognition program), a voice output routine (places synthesized speech in an output buffer for conversion to analog speech signals. Triggers the D/A to generate the speech), a data output routine (passes the data in the output data buffer to the attached peripheral device), a data input routine (receives data from the attached peripheral device and passes it to the speech synthesizer. Triggers the speech synthesizer), a speech recognition program (converts digitized speech into text), and a speech synthesizer program (converts text words to synthesized speech). It is further preferred that when no other functions are being performed, the control program places itself in the speech input mode, allowing the speech recognition program to run.

Thus, it is contemplated that a voice recognition peripheral device (VRPD) is in electronic communication with and releasably attached to a personal digital assistant (PDA), wherein the VRPD processes a user voice into a digital data element using a voice recognition algorithm, and wherein the digital data element is transferred to the PDA. Consequently, a method of operating an electronic device includes a step in which a voice recognition peripheral device (VRPD) and a personal digital assistant (PDA) executing a program are provided. In a further step, the VRPD is releasably attached to the PDA thereby providing electronic communication between the VRPD and the PDA, wherein the VRPD receives a first data element from the program and a voice command provided by a user, the VRPD processes the first data element into an audible prompt, and wherein the VRPD processes the voice command into a second data element using a voice recognition algorithm and transfers the second data element to the program. Alternatively, it is contemplated that a method of operating an electronic device has a step in which a voice recognition peripheral device (VRPD) and a personal digital assistant (PDA) are provided. In a further step, the VRPD is releasably attached to the PDA thereby providing electronic communication between the VRPD and the PDA, and in a still further step, a user voice is processed into a digital data element using a voice recognition algorithm provided by the VRPD. In a still further step, the digital data element is transferred from the VRPD to the PDA via an electronic interface.

Thus, specific embodiments and applications of voice recognition peripherals have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An apparatus comprising:
   a hand-held voice recognition peripheral device (VRPD) in electronic communication with and releasably attached to a personal digital assistant (PDA) that executes a program;
   wherein the VRPD receives a first data element from the program and a voice command provided by a user;
   wherein the VRPD processes the first data element into an audible prompt; and
   wherein the VRPD processes the voice command into a second data element using a voice recognition algorithm and transfers the second data element to the program.

2. The apparatus of claim 1 wherein the program intercepts a prompt from an application that is executing on the PDA and converts the prompt into the first data element.

3. The apparatus of claim 2 wherein the program converts the second data element into an input into the application.

4. The apparatus of claim 3, wherein the voice recognition algorithm comprises a continuous speech algorithm.

5. The apparatus of claim 4, wherein the voice recognition algorithm uses a user uploaded set of data to process the voice command into the second data element.

6. The apparatus of claim 2, wherein the application is selected from the group consisting of a calendar application, an address book application, and a memo application.

7. The apparatus of claim 6, wherein the audible prompt includes a selection-prompt to the user to select at least one of the applications.

8. The apparatus of claim 6, wherein the audible prompt includes a request-prompt that requests an application-input for at least one of the applications.

9. The apparatus of claim 1, wherein the electronic communication is performed at least in part via a RS232 interface.

10. An apparatus comprising:
    a hand-held voice recognition peripheral device (VRPD) in electronic communication with and releasably attached to a personal digital assistant (PDA), wherein the VRPD processes a user voice into a digital data element using a voice recognition algorithm, and wherein the digital data element is transferred to the PDA.

11. The apparatus of claim 10, wherein the voice recognition algorithm comprises a continuous speech algorithm.

12. The apparatus of claim 10, wherein the voice recognition algorithm comprises a discrete speech algorithm.

13. A method of operating an electronic device comprising:
    providing a hand-held voice recognition peripheral device (VRPD) and a personal digital assistant (PDA) executing a program;
    releasably attaching the VRPD to the PDA thereby providing electronic communication between the VRPD and the PDA;
    wherein the VRPD receives a first data element from the program and a voice command provided by a user;
    wherein the VRPD processes the first data element into an audible prompt; and
    wherein the VRPD processes the voice command into a second data element using a voice recognition algorithm and transfers the second data element to the program.

14. The method of operating an electronic device of claim 13, wherein the program intercepts a prompt from an application that is executing on the PDA and converts the prompt into the first data element.

15. The method of operating an electronic device of claim 14, wherein the program converts the second data element into an input into the application.

16. The method of operating an electronic device of claim 15, wherein the voice recognition algorithm comprises a continuous speech algorithm.

17. A method of operating an electronic device comprising:
    providing a hand-held voice recognition peripheral device (VRPD) and a personal digital assistant (PDA);
    releasably attaching the VRPD to the PDA thereby providing electronic communication between the VRPD and the PDA;
    processing a user voice into a digital data element using a voice recognition algorithm provided by the VRPD; and
    transferring the digital data element from the VRPD to the PDA via an electronic interface.

18. The method of claim 17 wherein the interface comprises an RS232 interface.

* * * * *